(12) United States Patent
Noda

(10) Patent No.: US 7,576,574 B2
(45) Date of Patent: Aug. 18, 2009

(54) CONSTANT CURRENT CIRCUIT AND LIGHT EMITTING DIODE DRIVE CIRCUIT

(75) Inventor: Ippei Noda, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/047,100

(22) Filed: Mar. 12, 2008

(65) Prior Publication Data

US 2008/0224632 A1 Sep. 18, 2008

(30) Foreign Application Priority Data

Mar. 14, 2007 (JP) .............................. 2007-064565

(51) Int. Cl.
*H03B 1/00* (2006.01)
(52) U.S. Cl. ..................... 327/108; 327/132; 327/333
(58) Field of Classification Search ............. 315/209 R, 315/224, 291, 300, 302, 307; 327/53, 66, 327/100, 108–109, 132, 231, 237, 333; 323/212, 323/312, 315–316; 307/43
See application file for complete search history.

(56) References Cited

U.S. PATENT DOCUMENTS 5,894,236 A * 4/1999 Mizoguchi et al. .......... 327/108
6,724,235 B2 * 4/2004 Costa et al. ................. 327/378
7,161,412 B1 * 1/2007 Manganaro ................. 327/543
2005/0068066 A1 * 3/2005 Yamashita et al. ............ 327/65
2007/0108958 A1 5/2007 Minakuchi

FOREIGN PATENT DOCUMENTS

| JP | 9-319323 | 12/1997 |
|---|---|---|
| JP | 2004-180007 | 6/2004 |

* cited by examiner

*Primary Examiner*—David Hung Vu
*Assistant Examiner*—Tung X Le
(74) *Attorney, Agent, or Firm*—Dickstein Shapiro LLP

(57) ABSTRACT

A constant current generator which includes a first transistor to supply current in accordance with a control signal, a second transistor that is a MOS transistor having an equal impurity type to the first transistor. To supply current to a load in accordance with the control signal, a gate and source of the second transistor are connected to a gate and source of the first transistor, respectively. Also, there is a voltage adjustor to adjust drain voltage of the first transistor in accordance with drain voltage of the second transistor, a constant current generation circuit including a first current source to supply first current to the first transistor through the voltage adjustor, and a level shifter to shift a voltage at a connection node of the voltage adjustor and the constant current generation circuit, output a shifted voltage to each gate of the first and second transistors.

20 Claims, 5 Drawing Sheets

CONSTANT CURRENT CIRCUIT AND LIGHT EMITTING DIODE DRIVE CIRCUIT

CROSS-REFERENCE TO RELATED APPLICATION

This patent application claims priority to Japanese Patent Application No. 2007-064565, filed on Mar. 14, 2007 in the Japan Patent Office, the entire contents of which are incorporated by reference herein.

FIELD

This patent specification relates to a constant current circuit, and more particularly, to a constant current circuit and a light emitting diode drive circuit.

BACKGROUND

Recently, light emitting diodes (LED) have come to be widely used in a variety of fields, for example, display devices, optical disk apparatuses, and the like, because of their low power requirements and long life. The light emitting diode emits light by supplying an electrical current to the light emitting diode.

The light emitting diode for the display device is generally driven by a constant current circuit to reduce variation in brightness. To adjust the brightness to a specific use, a setting condition for the current of the constant current circuit is generally adjusted. However, a voltage drop at the light emitting diode changes in accordance with the current of the light emitting diode, and accordingly, voltage at a terminal of an output transistor changes dramatically. The terminal of an output transistor is configured to be an output terminal of the constant current circuit, and generally a drain electrode of a MOS transistor is used as the output terminal of the constant current circuit. When the voltage of the output terminal changes by a large amount, the brightness of the light emitting diode varies because the output current changes due to a channel length modulation effect of the MOS transistor.

To solve such a problem, a constant current circuit shown in FIG. 1 has been proposed. The constant current circuit includes an error amplifier OP102, an NMOS transistor M116, PMOS transistors M114 and M115, a resistor R111, NMOS transistors M111, M112, M141, and M142, and a reference voltage generator 107, and a bias voltage generator 108. In FIG. 1, NMOS transistors M111, M112, M141, and M142 form a current mirror circuit so that an output current $i_{out}$ (mirror current) is output to an external load 110 connected to an output terminal OUT. The output current is obtained by multiplying a current $i_{ref1}$ by a ratio determined by a ratio of transistor sizes of the NMOS transistors M111 and M112. The error amplifier OP102 controls the NMOS transistor M116 so that a voltage at a connection node of the resistor R111 and the NMOS transistor M116 becomes equal to a reference voltage $V_{ref}$. A current $i_{ref2}$ flowing through the resistor R111 is expressed by a formula, $i_{ref2}=V_{ref}/r111$, where a resistance of the resistor R111 is r111. The current $i_{ref2}$ becomes the current $i_{ref1}$ as shown in FIG. 1 because of a current reflection effect created by a current mirror circuit which comprises the PMOS transistors M114 and M115.

An output circuit comprised of the NMOS transistor M111, M112, M141, and M142 forms a cascode-current-mirror circuit. A drain voltage of the NMOS transistor M112 is always equal to a drain voltage of the NMOS transistor M111 and independent of a voltage at the output terminal OUT. Accordingly, the output current $i_{out}$ may not be affected by voltage fluctuation at the output terminal OUT. However, since an output transistor is that is a two transistors by connecting the NMOS transistors M112 and M142 in series, a large output voltage is required for the output transistor to work in a saturation operation region in which a desired constant current is output even if the output circuit is formed of a low-voltage-cascade-current-mirror circuit.

A drain-source voltage $V_{ds1}$ of the NMOS transistor M112 between a drain and a source of the NMOS transistor M112 is expressed by a formula (a):

$$V_{ds1}=V_{bias}-V_{gs2} \quad (a),$$

where, for example, the NMOS transistors M111, M112, M141, and M142 have an equal transistor size and an equal conductivity, each threshold voltage of the transistors is $V_{thn}$, a gate-source voltage of the NMOS transistor M142 is $V_{gs2}$, a bias voltage generated by the bias voltage generator 108 is $V_{bias}$, and an overdrive voltage is $V_{ov}$.

When the bias voltage $V_{bias}$ is set to be a formula $V_{bias}=V_{gs2}+V_{ov}$ so that the NMOS transistor M112 works at a boundary operation region between the saturation and linear operation regions, the formula (a) becomes a formula (b):

$$V_{ds1}=V_{ov} \quad (b)$$

When the NMOS transistor M142 also works at a boundary operation region between the saturation and linear operation regions, a drain-source voltage $V_{ds2}$ of the NMOS transistor M142 between drain and source of the NMOS transistor M142 is expressed by a formula (c):

$$V_{ds2}=V_{ov} \quad (c)$$

Therefore, a minimum output voltage $V_{omin}$ at the output terminal OUT is expressed by a formula (d):

$$V_{omin}=V_{ds1}+V_{ds2}=2\times V_{ov} \quad (d)$$

In common CMOS processes, the minimum voltage $V_{omin}$ is 0.6 v to 1.0 v. When the output voltage at the output terminal OUT increases, power consumption by the output transistor of the constant current circuit also increases.

An output transistor having a large size is generally employed to output a large current to drive the light emitting device. Accordingly, a chip size increases and causes a cost penalty, especially when the output transistor is formed of two transistors by connecting the NMOS transistors M112 and M142 in series. Further, the drain-source voltage of the NMOS transistor M142 changes in accordance with the output voltage at the output terminal OUT. Meanwhile, the drain-source voltage of the NMOS transistor M141 becomes $(V_{thn}+V_{ov})-V_{ov}=V_{thn}$. Because the drain-source voltages of the NMOS transistors M141 and M142 differ from each other, the gate-source voltages differ from each other. Consequently, the drain-source voltages of the NMOS transistors M111 and M112 differ from each other. Thus, a systematic error occurs in the output current $i_{out}$.

To solve the problem described above, another constant current circuit 290 shown in FIG. 2 is proposed. The constant current circuit 290 includes a current source I, an output circuit 200, a level shifter, and a variable resistor R. The output circuit 200 includes NMOS transistors NT1 and NT2. In the constant current circuit 290 shown in FIG. 2, an output current is kept constant even if an external load connected to an output terminal is changed. Further, an output transistor works in the saturation operation region even at a low output voltage at the output terminal OUT. In the constant current circuit shown in FIG. 2, if a variable resistor R is properly adjusted, a systematic error can be avoided without using a cascode-current-mirror circuit, and a constant current can be supplied accurately because the drain-source voltages of the NMOS transistors NT1 and NT2 are equal.

However, a drain voltage of the NMOS transistor NT1 is adjusted only in a voltage range from a voltage at which the NMOS transistor NT2 works in the saturation operation region to a gate-source voltage of the NMOS transistor NT2. An overdrive voltage $V_{o2}$ is expressed by a formula, $V_{ov2} \leq V_o \leq V_{thn}+V_{ov2}$, where the threshold voltage of the NMOS transistor NT2 is $V_{thn}$. In other words, the voltage range of the output voltage $V_o$ at the output terminal OUT for supplying a constant current without a systematic error is very narrow.

SUMMARY

This patent specification describes a novel constant current generator which includes a first transistor to supply current in accordance with a control signal, and a second transistor formed of a MOS transistor having an equal impurity type to the first transistor. To supply current to a load in accordance with the control signal, gate and source of the second transistor are connected to gate and source of the first transistor, respectively, and there is a voltage adjustor to adjust drain voltage of the first transistor in accordance with drain voltage of the second transistor, a constant current generation circuit including a first current source to supply first current to the first transistor through the voltage adjustor, and a level shifter to shift a voltage at a connection node of the voltage adjustor and the constant current generation circuit, and output a shifted voltage to each gate of the first and second transistors.

This patent specification further describes a novel light emitting diode drive circuit which employs a constant current generator including a first transistor to supply current in accordance with a control signal, a second transistor formed of MOS transistor having an equal impurity type to the first transistor, and to supply current to a load in accordance with the control signal, gate and source of the second transistor are connected to gate and source of the first transistor, respectively, a voltage adjustor to adjust drain voltage of the first transistor in accordance with drain voltage of the second transistor, a constant current generation circuit including a first current source to supply first current to the first transistor through the voltage adjustor, and a level shifter to shift a voltage at a connection node of the voltage adjustor and the constant current generation circuit, output a shifted voltage to each gate of the first and second transistors.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
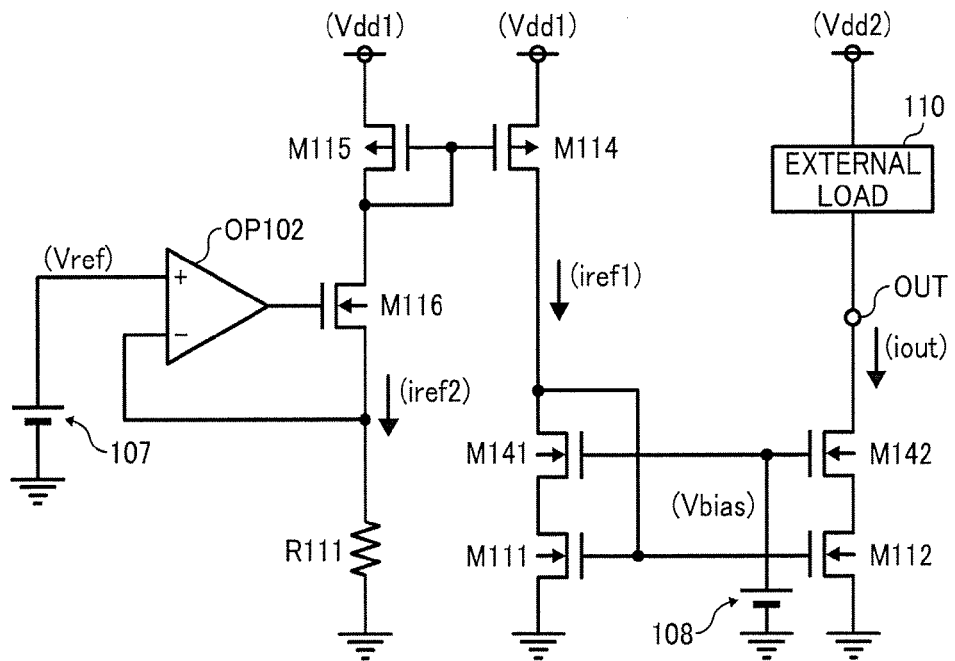
FIG. 1 illustrates a conventional constant current circuit.
Figure 2:
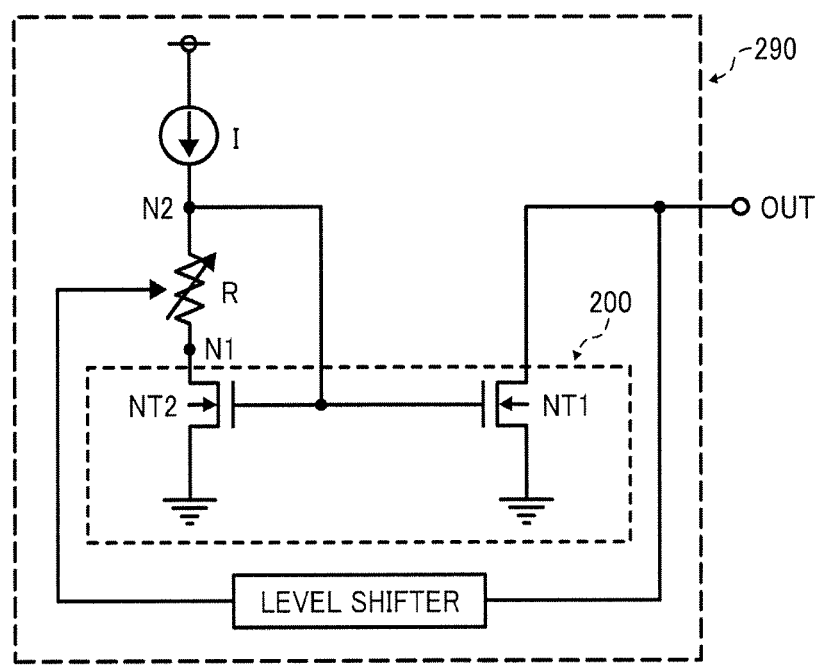
FIG. 2 illustrates another conventional constant current circuit.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, wherein like reference numerals designate identical or corresponding parts throughout the several views, switching regulators according to example embodiments are described.

Figure 3:
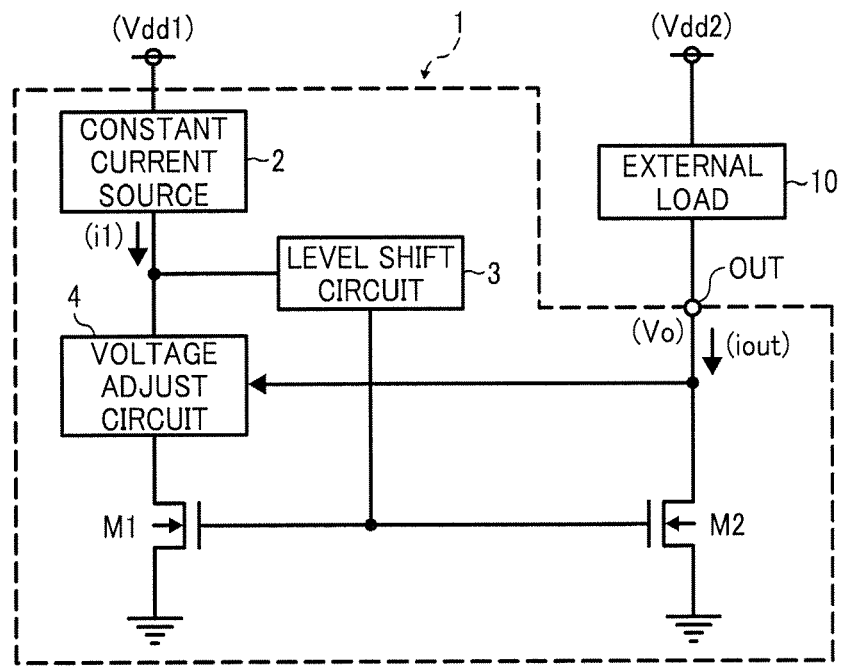
FIG. 3 is a block diagram of a constant current circuit according to a first example embodiment of the disclosure.

FIG. 3 is a block diagram of a constant current circuit according to a first example embodiment of the disclosure. The constant current circuit 1 generates a predetermined constant current, and supplies the constant current from an output terminal OUT to an external load 10 such as a light emitting diode. The constant current circuit 1 includes a constant current source 2, a level shifter 3, a voltage adjustor 4, and NMOS transistors M1 and M2. The constant current source 2 generates a predetermined constant current i1. In FIG. 3, if the external load 10 is a light emitting diode and the constant current circuit 1 is a drive circuit for the light emitting diode, an anode of the light emitting diode is connected to power supply $V_{dd2}$ and a cathode of the light emitting diode is connected to an output terminal OUT.

The external load 10 is connected between the power supply $V_{dd2}$ and the output terminal OUT. A drain of the NMOS transistor M2 is connected to the output terminal OUT. Each source of the NMOS transistors M1 and M2 is connected to ground. Gates of the NMOS transistors M1 and M2 are commonly connected and a connection node of the gates of the NMOS transistors M1 and M2 is controlled by the level shifter 3. To a drain of the NMOS transistor M1, a current is supplied from the constant current source 2 through the voltage adjustor 4. The power supply $V_{dd1}$ supplies power to the constant current source 2.

The voltage adjustor 4 adjusts the drain voltage of the NMOS transistor M1 based on the drain voltage of the NMOS transistor M2 so that the drain voltage of the NMOS transistor M1 becomes the drain voltage of the NMOS transistor M2. Further, the level shifter 3 controls each gate voltage of the NMOS transistors M1 and M2 so that a voltage at a connection node of the constant current source 2 and the voltage adjustor 4 shifts by a predetermined voltage. That is, the level shifter 3 shifts a voltage at the connection node of the constant current source 2 and the voltage adjustor 4 by the predetermined voltage, and outputs the shifted voltage to each gate the NMOS transistors M1 and M2.

Figure 4:
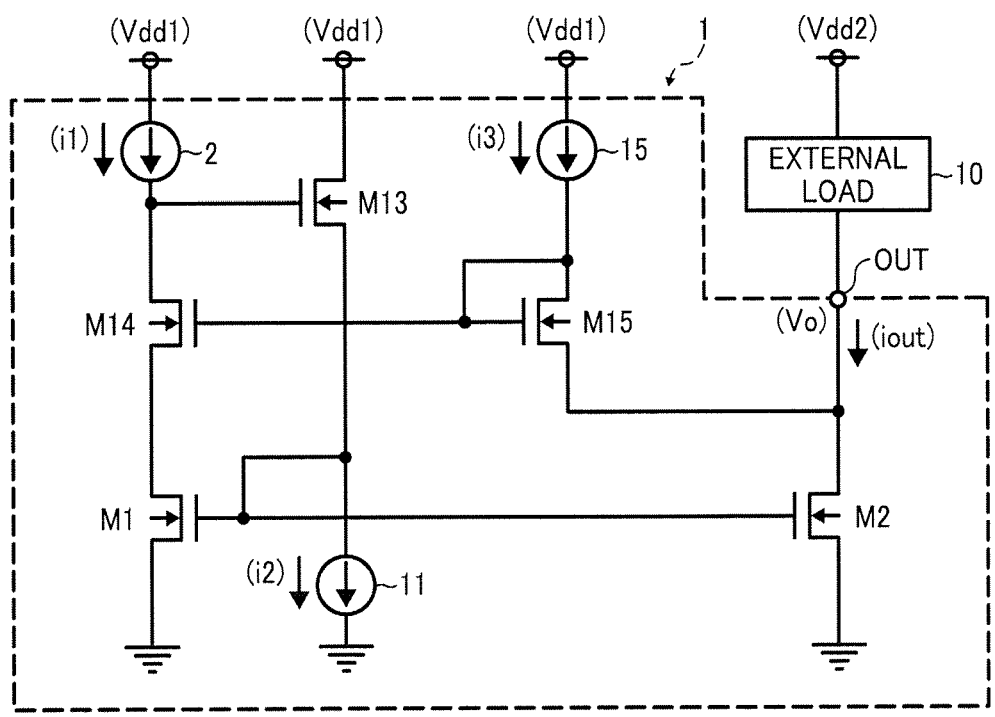
FIG. 4 illustrates an example circuit of the constant current circuit of FIG. 3.

FIG. 4 illustrates an example circuit of the constant current circuit 1 shown in FIG. 3. In FIG. 4, the level shifter 3 includes an NMOS transistor M13 and a constant current source 11 that supplies a constant current i2. The voltage adjustor 4 includes NMOS transistors M14 and M15 and a constant current source 15 that supplies constant current i3. The constant current source 2 and the NMOS transistor M14 are connected in series between the power supply $V_{dd1}$ and a drain of the NMOS transistor M1. A connection node of the constant current source 2 and the NMOS transistor M14 is connected to a gate of the NMOS transistor M13.

The NMOS transistor M13 and the constant current source 11 are connected in series between the power supply $V_{dd1}$ and ground. A connection node of the NMOS transistor M13 and the constant current source 11 is connected to each gate of the NMOS transistors M1 and M2. Further, the constant current source 15 and the NMOS transistor M15 are connected in series between the power supply $V_{dd1}$ and a drain of the NMOS transistor M2. Each gate of the NMOS transistors M14 and M15 is commonly connected, and a connection node of the gates of the NMOS transistors M14 and M15 is connected to the drain of the NMOS transistor M15.

As can be seen in FIG. 3 as well as FIG. 4, the NMOS transistor M1 forms a first transistor, and the NMOS transistor M2 forms a second transistor. The constant current source 2 forms a first constant current source unit, the level shifter 3 forms a level-shift-circuit, and the voltage adjustor 4 forms a voltage-adjustment-circuit. The NMOS transistor M13 forms a third transistor, the NMOS transistor M14 forms a fourth transistor, and the NMOS transistor M15 forms a fifth transistor. The constant current source 11 forms a second constant current source unit, and the constant current source 15 forms a third constant current source unit. The constant current circuit 1 may be integrated in one IC (Integrated Circuit).

In this circuit configuration, the NMOS transistor M13 and the constant current source 11 form a source-follower circuit. A drain voltage of the NMOS transistor M14 is a voltage at a connection node of the constant current source 2 and the NMOS transistor M14. A shifted voltage shifted by a gate-source voltage of the NMOS transistor M13 from the drain voltage of the NMOS transistor M14 is output to each gate of the NMOS transistors M1 and M2.

In the following description, each gate-source voltage of the NMOS transistors M1, M2, M13, M14, and M15 is defined as $V_{gs1}$, $V_{gs2}$, $V_{gs13}$, $V_{gs14}$ and $V_{gs15}$, respectively. Similarly, each drain-source voltage of the NMOS transistors M1 and M2 is defined as $V_{ds1}$ and $V_{ds2}$, respectively.

Since the source voltage of the NMOS transistor M15 is the drain voltage of the NMOS transistor M2, the gate voltage of the NMOS transistor M15 is expressed by a formula (1):

$$V_{g15} = V_{ds2} + V_{gs15} \tag{1}$$

Since each gate of the NMOS transistors M14 and M15 is commonly connected, a drain voltage $V_{d1}$ of the NMOS transistor M1 becomes a voltage that is dropped by the gate-source voltage $V_{gs14}$ of the NMOS transistors M14 from the gate voltage $V_{g15}$ of the NMOS transistor M15, and is expressed by a formula (2) referring to the formula (1):

$$\begin{aligned} V_{d1} &= V_{g15} - V_{gs14} \\ &= (V_{ds2} + V_{gs15}) - V_{gs14} \end{aligned} \tag{2}$$

The constant currents are expressed by formulas (3) and (4), respectively, $$i1 = \beta14 \times (V_{gs14} - V_{thn})^2 \tag{3}$$

$$i3 = \beta15 \times (V_{gs15} - V_{thn})^2 \tag{4}$$

where the NMOS transistors M14 and M15 are formed of NMOS transistors having equal conductivity and threshold, and β14 and β15 are current gains of the NMOS transistors M14 and M15, respectively.

Based on the formulas (3) and (4), a formula (5) is obtained:

$$i1/i3 = \beta14/\beta15 \times (V_{gs14} - V_{thn})^2 / (V_{gs15} - V_{thn})^2 \tag{5}$$

Based on the formula (5), a formula "$V_{d1} = V_{d2}$" becomes true based on the formula (2) if a following formula (6) is made true:

$$i1/\beta14 = i3/\beta15 \tag{6}$$

Gate, drain, and source voltages become equal when each transistor size of the NMOS transistors M14 and M15 and each amount of the constant current i1 and i3 is determined to realize the formula (6). Accordingly, the NMOS transistor M2 can output a current determined by a transistor size ratio of the NMOS transistors M1 and M2 accurately without being affected by λ characteristic.

A drain voltage $V_{d14}$ of the NMOS transistor M14 becomes $$V_{d14} = V_{gs1} + V_{gs13},$$

and when a drain-source voltage of the NMOS transistor M14 is $V_{ds14}$, the following formula is obtained:

$$V_{d1} + V_{ds14} = V_{d14} = V_{gs1} + V_{gs13}$$

Further, a formula (7) is obtained because of "$V_{d1} = V_{d2}$":

$$V_{ds14} = V_{gs1} + V_{gs13} - V_{d2} \tag{7}$$

When an overdrive voltage of the NMOS transistor M14 is defined as $V_{ov14}$, the following formula is established based on the formula (7) because "$V_{ds14} \geq V_{ov14}$" is a necessary condition for the NMOS transistor M14 to work in a saturation operation region:

$$V_{gs1} + V_{gs13} - V_{d2} \geq V_{ov14}$$

When each transistor size of the NMOS transistors M1 and M14 have equal transistor size and equal conductivity, each threshold voltage of the transistors M1 and M14 is $V_{thn}$, and an overdrive voltage is $V_{ov1}$, the above formula becomes:

$$V_{thn} + V_{ov1} + V_{gs3} - V_{d2} \geq V_{ov14}$$

Since $V_{ov1} = V_{ov14}$, the following formulas are obtained:

$$V_{thn} + V_{gs3} - V_{d2} \geq 0$$

$$V_{thn} + V_{gs3} \geq V_{d2}$$

When the threshold voltage of the NMOS transistor M13 is $V_{thn}$, and an overdrive voltage is $V_{ov13}$, the following formula is then obtained:

$$V_{thn} + (V_{thn} + V_{ov13}) \geq V_{d2}$$

Further, a formula (8) is obtained:

$$V_{ds2} = V_{d2} \leq V_{thn} \times 2 + V_{ov13} \tag{8}$$

A threshold value $V_{thn}$ is generally determined by a manufacturing process, and the overdrive voltage $V_{ov13}$ can be set arbitrarily with the transistor size of the NMOS transistor M13 and the constant current i2 flowing through the NMOS transistor M13. Accordingly, an operational voltage condition of the circuit can be determined so as to adjust to a change of the drain voltage $V_{d2}$ of the NMOS transistor M2.

Next, a minimum drain voltage necessary for the NMOS transistor M2 to work in a saturation operation region is now described.

A condition under which the NMOS transistor M2 works in a saturation operation region is expressed by the following formula, $$V_{ds2} \geq V_{gs2} - V_{thn} = V_{ov2} \tag{9}$$

where the threshold voltage of the NMOS transistor M2 is $V_{thn}$ and an overdrive voltage is $V_{ov2}$. Therefore, a minimum voltage of the output voltage $V_o$ at the output terminal becomes $V_{ov2}$, and the minimum voltage can be decreased to half the minimum voltage of the conventional constant current circuit.

For example, where each condition is determined to be $V_{thn}=0.8v$, $V_{ov2}=0.3v$, $V_{ov13}=0.3v$, a condition under which the drain voltages of the NMOS transistors M11 and M2 are equal is a range of $V_{ds2} \leq 1.9$ v based on the formula (8). Further, based on the formula (9), a condition under which the NMOS transistor M2 works in a saturation operation region is a range of $V_{ds2} \geq 0.3v$. That is, output current accuracy can be maintained within a range of $$0.3v \leq V_{ds2} \leq 1.9v \quad (10)$$

On the other hand, in the conventional constant current circuit shown in FIG. 1, a condition under which output current accuracy is maintained is a range of $Vo \leq 1.1v$ where $V_{thn}=0.8v$, and $V_{ov}=0.3v$. Namely, an output current accuracy can be maintained within a range of $$0.3v \leq Vo \leq 1.1v \quad (11)$$

In other words, the range within which output current accuracy can be maintained is narrower in the conventional constant current circuit shown in FIG. 1 than in the constant current circuit of the first example embodiment described above.

Figure 5:
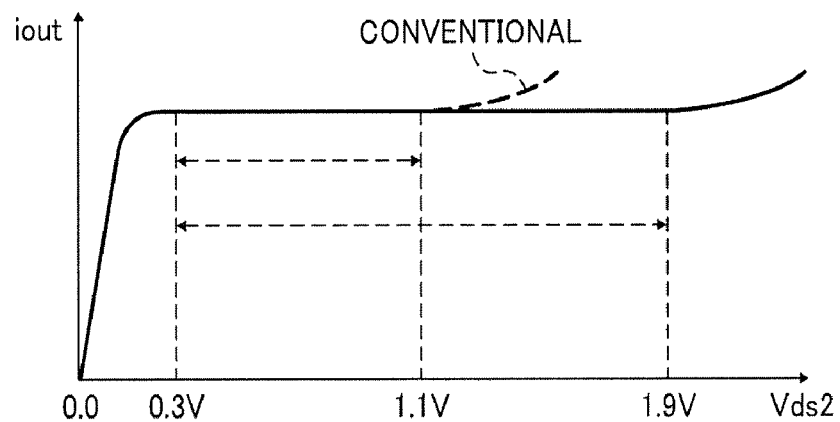
FIG. 5 illustrates a graph showing example output current characteristics.

FIG. 5 illustrates a graph showing example output current characteristics in consideration of the conditions (10) and (11). In FIG. 5, a solid line shows an output current characteristic of the constant current circuit 1 according to the first example embodiment of the disclosure and a dotted line shows an output current characteristic of the conventional constant current circuit.

Referring to FIG. 5, a maximum drain-source voltage at which an output current accuracy is maintained in the conventional constant current circuit is found to be 1.1v. However, a maximum drain-source voltage according to the present example embodiment is 1.9v, which is larger in comparison to the maximum drain-source voltage of the conventional constant current circuit. Thus, the maximum drain-source voltage to maintain the output accurate current is improved.

It is to be noted that the circuit shown in FIG. 5 is one example, and it is possible to set the maximum drain-source voltage more than 1.9v because the overdrive voltage $V_{ov13}$ can be determined arbitrarily.

Figure 6:
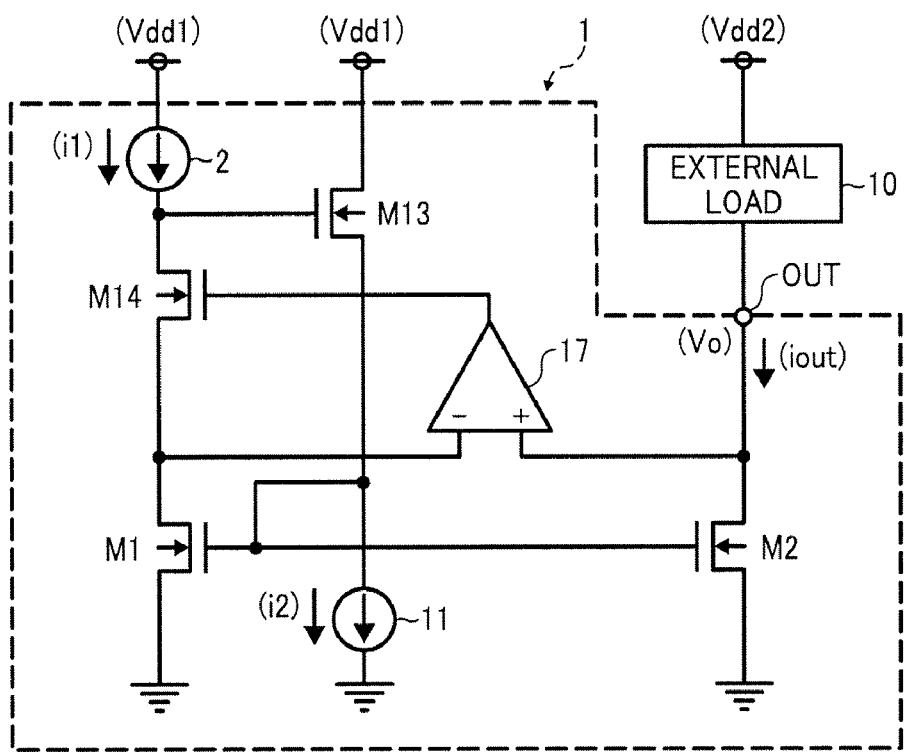
FIG. 6 illustrates another example circuit of the constant current circuit according to the first example embodiment.

FIG. 6 illustrates another example circuit of the constant current circuit 1 according to the first example embodiment. In FIG. 6, identical reference characters are assigned to identical or similar circuit members in FIG. 4 and descriptions thereof are omitted. The circuitry shown in FIG. 6 is different from that shown in FIG. 4 in the circuit configuration of the voltage adjustor 4.

In FIG. 6, the voltage adjustor 4 comprises an error amplifier 17 and an NMOS transistor M14. As for the error amplifier 17, the drain of the NMOS transistor M2 is connected to a non-inverted input terminal, the drain of the NMOS transistor M1 is connected to an inverted input terminal, and the gate of the NMOS transistor M14 is connected to the output terminal. In this circuit configuration, the error amplifier 17 controls a gate voltage of the NMOS transistor M14 so that a drain voltage $V_{d1}$ of the NMOS transistor M1 is equal to a drain voltage $V_{d2}$ of the NMOS transistor M2, that is $V_{d1}=V_{d2}$.

In the NMOS transistors M1 and M2, all the gate, drain, and source voltages are equal. Accordingly, the NMOS transistor M2 can output a current determined by a transistor size ratio of the NMOS transistors M1 and M2 accurately without being affected by the λ characteristic of the MOS transistor. Owing to this negative feedback loop of the error amplifier 17, each drain voltage of the NMOS transistors M1 and M2 can be adjusted to equal every other accurately.

Thus, in the constant current circuit according to the first example embodiment, the NMOS transistors M141 and M142 shown in FIG. 1, which correspond to cascade elements in the conventional constant current circuit, are not necessary. As a result, chip size can be dramatically reduced. Further, it is possible to output an output current stably and accurately without a systematic error due to deviation in the output voltage. Minimum voltage at the output terminal OUT can be reduced to half the minimum voltage of the conventional constant current circuit, so that power consumption at the output transistor can be reduced to half the power consumption of the conventional constant current circuit. Therefore, it is possible to obtain a wider operation voltage range in which the accurate output current can be output so as to expand versatility of the constant current circuit.

Overshoot and undershoot in the output current $i_{out}$ may occur when a gate voltage of the NMOS transistor M13 changes abruptly at a start-up operation and an operational condition change. A constant current circuit according to a second example embodiment which can prevent such overshoot and undershoot in the output current $i_{out}$ is now described.

Figure 7:
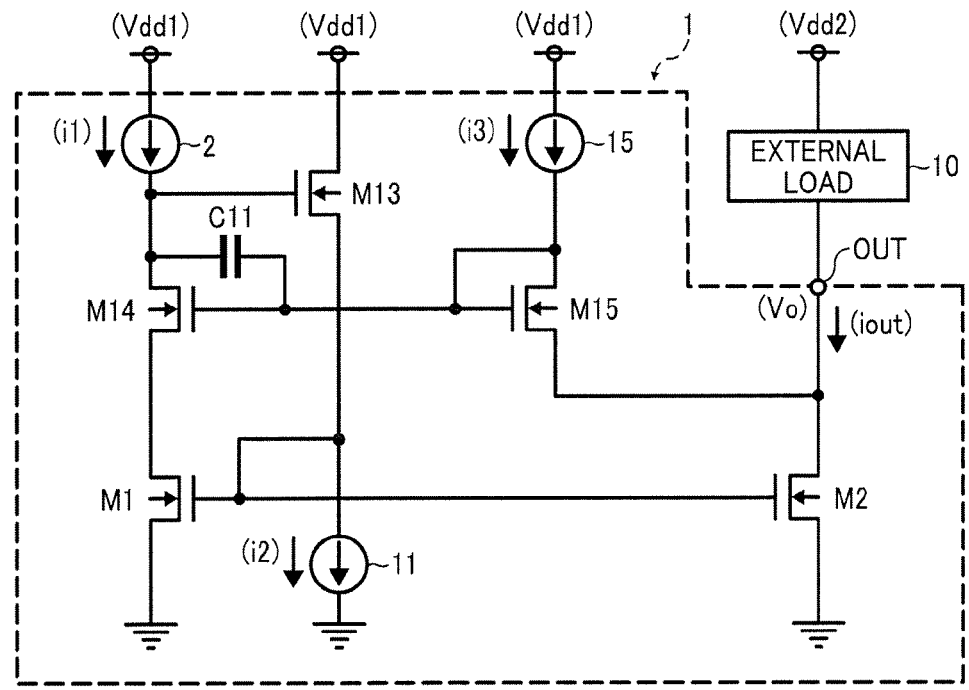
FIG. 7 illustrates a constant current circuit according to a second example embodiment.

FIG. 7 illustrates the constant current circuit according to the second example embodiment. In FIG. 7, identical reference characters are assigned to identical or similar circuit members shown in FIG. 4 and descriptions thereof omitted. FIG. 7 is different from FIG. 4 because of a capacitor C11 added between the gate and the drain of the NMOS transistor M14.

The capacitor C11 contributes to stable operation by preventing overshoot and undershoot in the output current $i_{out}$ by reducing an abrupt change in the gate voltage of the NMOS transistor M13, especially at the start-up operation and at a setting mode change of the constant current i1.

The constant current circuit according to the second example embodiment can obtain an effect similar to that of the constant current circuit according to the first example embodiment, and can prevent overshoot and undershoot in the output current $i_{out}$. Therefore, it is possible to avoid improper operation without supplying excessive current to an external load 10.

A gate voltage of the NMOS transistor M1 may increase drastically to supply the constant current i1 to the NMOS transistor M1 in the first example embodiment when the drain voltage of the NMOS transistor M2 drops, and the NMOS transistor M1 works in a liner operation region under a condition in which the drain voltage of the NMOS transistor M1 is lower than the drain voltage of the NMOS transistor M2 due to variation during the manufacturing processes. Further, if the drain voltage of the NMOS transistor M2 is larger than the drain voltage of the NMOS transistor M1, and the NMOS transistor M2 works in a saturation operation region, improper operation may occur, possibly resulting in output of a large output current that is larger than a setting current.

Figure 8:
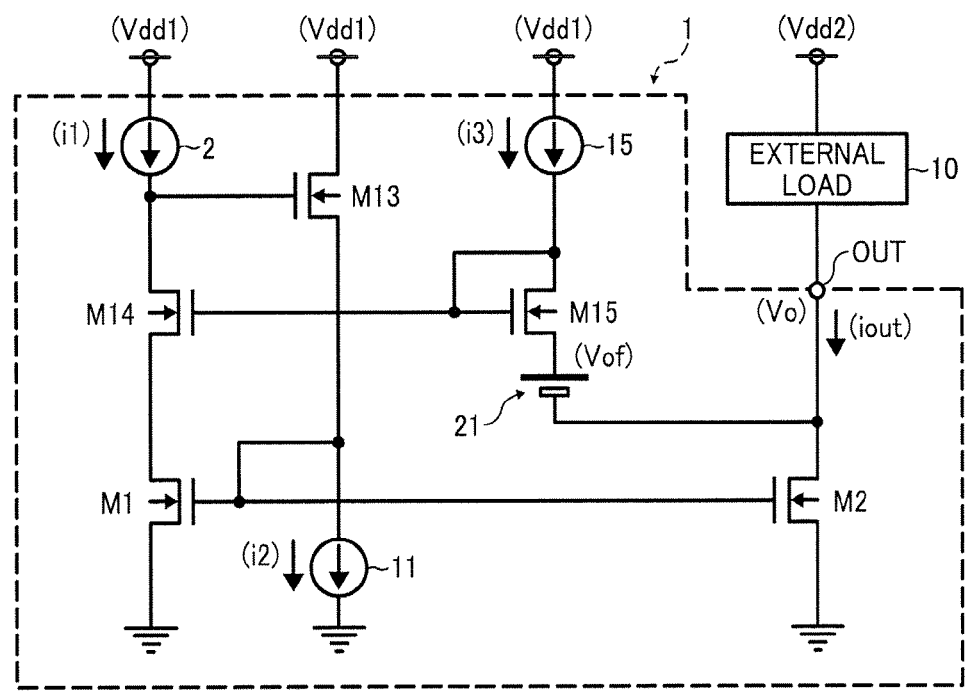
FIG. 8 illustrates a constant current circuit according to a third example embodiment.

FIG. 8 illustrates the constant current circuit according to a third example embodiment. In FIG. 8, identical reference characters are assigned to equal or similar circuit members shown in FIG. 4 and descriptions thereof omitted. FIG. 8 is different from FIG. 4 because of an offset voltage generator 21, which applies an offset voltage $V_{of}$ to the drain voltage of the NMOS transistor M2 to a source of the NMOS transistor M15. Further, an offset voltage source may be provided between the gate and the source of the NMOS transistors M14 and M15, respectively. The drain voltage of the NMOS transistor M1 is controlled to be larger than the drain voltage of the NMOS transistor M2 by the offset voltage $V_{of}$. The offset voltage generator 21 forms an offset voltage generation circuit.

In FIG. 8, the offset voltage generator 21 is provided. However, it is possible to generate an offset voltage without providing the offset voltage generator 21 by forming the NMOS transistors M14 and M15 to have different characteristics, for example, different transistor sizes.

In FIG. 8, the circuit configuration is based on FIG. 4. However, it is possible to obtain similar results by introducing an input offset voltage at an input portion of the error amplifier 17 of the FIG. 6. Further, a concept of the constant current circuit according to the third example embodiment can be applied to the constant current circuit according to the second example embodiment. More specifically, the capacitor C11 shown in the second example embodiment is provided between the drain and gate of the NMOS transistor M14. Thus, the constant current circuit according to the third example embodiment obtains results similar to those of the constant current circuit according to the first example embodiment. Further, it is possible to avoid improper operation due to the variation of the manufacturing processes to output a larger output current than a setting current value.

In the first, second, and third example embodiments, power supply voltages $V_{dd1}$ and $V_{dd2}$ may be equal voltages or they may be different voltages. The constant current circuit 1, a power supply circuit that generates the power supply voltage $V_{dd1}$, and a power supply circuit that generates the power supply voltage $V_{dd2}$ are integrated in one IC. Further, the external load and the constant current circuit 1 may be integrated in one IC.

Figure 9:
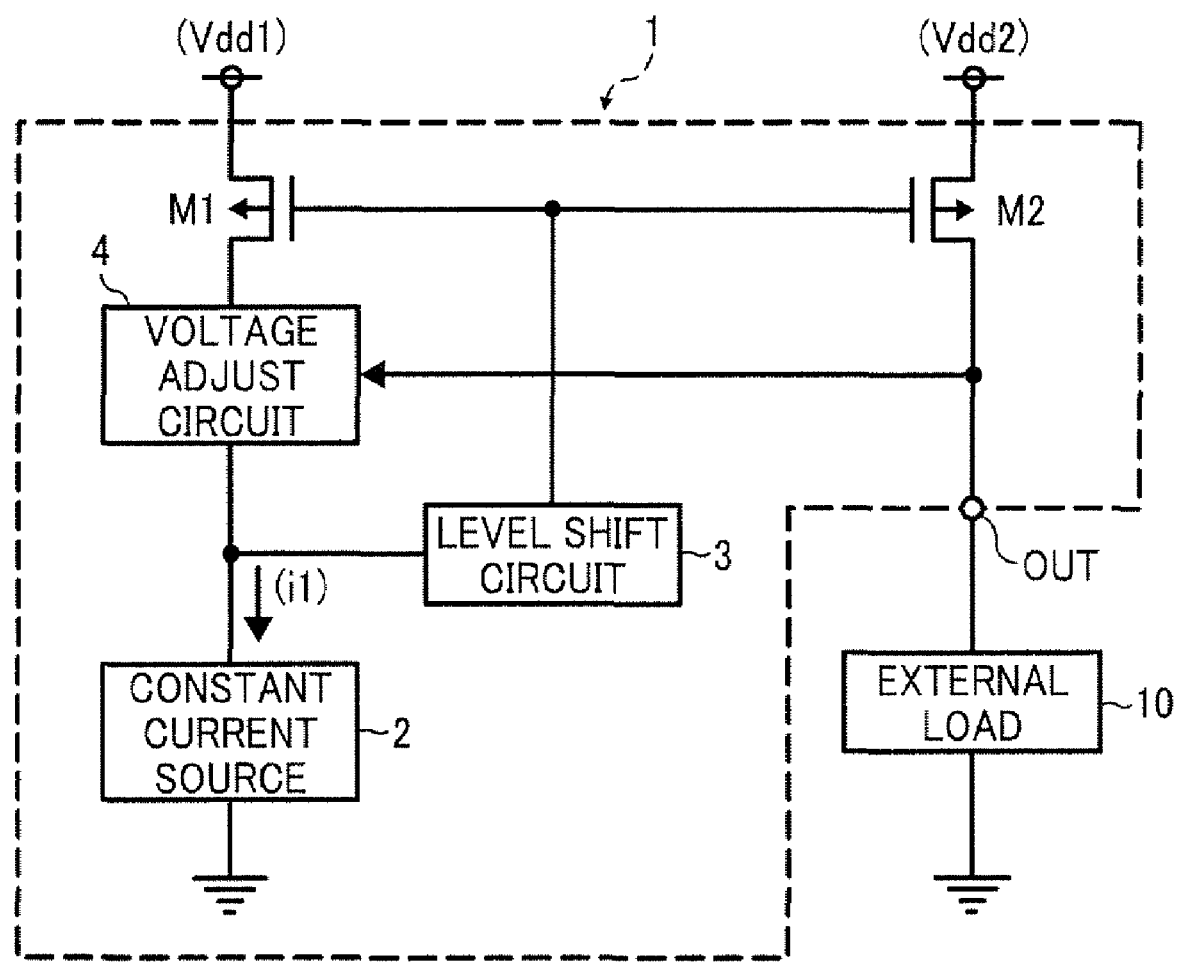
FIG. 9 illustrates a constant current circuit which employs PMOS transistors.

Although in the first, second, and third example embodiments NMOS transistors are employed, alternatively PMOS transistors may be employed for the output transistor. FIG. 9 illustrates a constant current circuit 1 that employs PMOS transistors. In FIG. 9, the external load is a light emitting diode. When a light emitting diode drive circuit comprises the constant current circuit 1, the cathode of the light emitting diode is connected to ground, and the anode of the light emitting diode is connected to the output terminal OUT.

Numerous additional modifications and variations are possible in light of the above teachings. It is therefore to be understood that within the scope of the appended claims, the disclosure of this patent specification may be practiced otherwise than as specifically described herein.

What is claimed is:

1. A constant current generator, comprising:
   a first transistor that is a MOS transistor configured to supply current in accordance with a control signal input to an input terminal of the transistor;
   a second transistor that is a MOS transistor having an equal impurity type to the first transistor and configured to supply current to the load in accordance with the control signal, and a gate and a source of the second transistor are connected to a gate and a source of the first transistor, respectively;
   a voltage adjustor configured to adjust a drain voltage of the first transistor in accordance with a drain voltage of the second transistor;
   a constant current generation circuit including a first current source to supply a first current to the first transistor through the voltage adjustor; and
   a level shifter configured to shift a voltage at a connection node of the voltage adjustor and the constant current generation circuit and to output a shifted voltage to each gate of the first and second transistors.

2. The constant current generator of claim 1, wherein the level shifter comprises:
   a third transistor that is a MOS transistor and connected to the connection node of the voltage adjustor and the constant current generation circuit; and
   a second current source configured to supply a second current to the third transistor,
   wherein the third transistor and the second current source form a source-follower circuit, and a connection node of the third transistor and the second current source is connected to each gate of the first and second transistors to shift a voltage at the connection node of the voltage adjustor and the constant current generation circuit by a gate-source voltage between a gate and a source of the third transistor.

3. The constant current generator of claim 1,
   wherein the voltage adjustor comprises:
   a fourth transistor that is an MOS transistor and connected between the constant current generation circuit and the first transistor;
   a fifth transistor that is a MOS transistor having an equal impurity type to the second transistor, one end of the fifth transistor is connected to a drain of the second transistor, and a gate of the fifth transistor is connected to the fourth transistor; and
   a third current source configured to supply a third current to another end of the fifth transistor,
   wherein a connection node of each gate of the fourth and fifth transistors is connected to a connection node of the third current source and the fifth transistor,
   wherein the fourth transistor is controlled so that a drain voltage of the first transistor becomes equal to drain voltage of the second transistor.

4. The constant current generator of claim 3, wherein a ratio of the first constant current and the third constant current is equal to a ratio of current gains of the fourth and fifth transistors.

5. The constant current generator of claim 3, wherein the fourth transistor is formed with an equal impurity type and size to the first transistor.

6. The voltage regulator of claim 1,
   wherein the voltage adjustor comprises:
   a fourth transistor connected between the constant current generation circuit and the first transistor;
   a voltage generator configured to generate a voltage generated by adding a predetermined voltage to the drain voltage of the second transistor;
   a fifth transistor that is a MOS transistor having an equal impurity type to the second transistor and configured to receive a voltage generated by the voltage generator at one end of the fifth transistor, and a gate of the fifth transistor is connected to the fourth transistor; and
   a third current source configured to supply a third current to another end of the fifth transistor,
   wherein a connection node of each gate of the fourth and fifth transistors is connected to a connection node of the third current source and the fifth transistor,
   wherein the fifth transistor is controlled so that the drain voltage of the first transistor becomes larger than the drain voltage of the second transistor by a predetermined voltage.

7. The constant current generator of claim 1,
   wherein the voltage adjustor comprises:
   a fourth transistor connected between the constant current generation circuit and the first transistor;

a fifth transistor that is a MOS transistor having an equal impurity type to the fourth transistor, a gate of the fifth transistor is connected to the fourth transistor, and one end of the fifth transistor is connected to a drain of the second transistor; and a third current source configured to supply a third current to another end of the fifth transistor, wherein a connection node of each gate of the fourth and fifth transistors is connected to a connection node of the third current source and the fifth transistor, wherein the fifth transistor is controlled so that the drain voltage of the first transistor becomes larger than the drain voltage of the second transistor by a predetermined voltage.

8. The constant current generator of claim 1, wherein the voltage adjustor further comprises:

a comparator configured to compare drain voltages of the first and second transistors, generate a signal indicating a comparison result, and output the signal; and a voltage adjustment circuit configured to control the drain voltage of the first transistor in accordance with the drain voltage of the second transistor.

9. The constant current generator of claim 8, wherein the comparator comprises:

an error amplifier configured to receive drain voltages of the first and second transistors at corresponding input terminals; and a fourth transistor connected to a drain of the first transistor in series, wherein an output signal of the error amplifier is input to a gate of the fourth transistor.

10. The constant current generator of claim 9, wherein the fourth transistor is a MOS transistor having equal conductivity to the first transistor, and the error amplifier controls the fourth transistor so that the drain voltage of the first transistor becomes equal to the drain voltage of the second transistor.

11. The constant current generator of claim 9, wherein the fourth transistor is a MOS transistor having equal conductivity to the first transistor, and the error amplifier controls the fourth transistor so that the drain voltage of the first transistor becomes larger than the drain voltage of the second transistor by a predetermined voltage.

12. The constant current generator of claim 9, wherein the voltage adjustment circuit comprises a capacitor connected between a gate of the fourth transistor and a connection node of the fourth transistor and the constant current generation circuit.

13. The constant current generator of claim 1, wherein the first transistor, the second transistor, the voltage adjustor, the constant current generation circuit, and the level shifter are integrated in one IC.

14. A light emitting diode drive circuit comprising:

a constant current generator comprising:

a first transistor that is a MOS transistor configured to supply current in accordance with a control signal input to an input terminal of the transistor;

a second transistor that is a MOS transistor having an equal impurity type to the first transistor and configured to supply power to the load in accordance with the control signal input to an input terminal, and a gate and a source of the second transistor are connected to a gate and a source of the first transistor, respectively;

a voltage adjustor configured to adjust a drain voltage of the first transistor in accordance with a drain voltage of the second transistor;

a constant current generation circuit including a first current source to supply a first current to the first transistor through the voltage adjustor; and a level shifter configured to shift a voltage at a connection node of the voltage adjustor and the constant current generation circuit and to output a shifted voltage to each gate of the first and second transistors.

15. The light emitting diode drive circuit of claim 14, wherein the level shifter comprises:

a third transistor that is a MOS transistor connected to the connection node of the voltage adjustor and the constant current generation circuit; and a second current source configured to supply second current to the third transistor, wherein the third transistor and the second current source form a source-follower circuit, wherein a connection node of the third transistor and the second current source is connected to each gate of the first and second transistors to shift a voltage at the connection node of the voltage adjustor and the constant current generation circuit by a gate to source voltage of the third transistor.

16. The light emitting diode drive circuit of claim 14, wherein the voltage adjustor comprises:

a fourth transistor that is a MOS transistor connected between the constant current generation circuit and the first transistor;

a fifth transistor that is a MOS transistor having an equal impurity type to the second transistor, one end of the fifth transistor is connected to a drain of the second transistor, and a gate of the fifth transistor is connected to the fourth transistor; and a third current source configured to supply a third current to another end of the fifth transistor, wherein a connection node of each gate of the fourth and fifth transistors is connected to a connection node of the third current source and the fifth transistor, wherein the fourth transistor is controlled so that a drain voltage of the first transistor becomes equal to drain voltage of the second transistor.

17. The light emitting diode drive circuit of claim 16, wherein a ratio of the first constant current and third constant current is equal to a ratio of current gains of the fourth and fifth transistors.

18. The light emitting diode drive circuit of claim 16, wherein the fourth transistor is formed with an equal impurity type and size to the first transistor.

19. The light emitting diode drive circuit of claim 14, wherein the voltage adjustor comprises:

a fourth transistor connected between the constant current generation circuit and the first transistor;

a voltage generator configured to generate a voltage generated by adding a predetermined voltage to the drain voltage of the second transistor;

a fifth transistor that is a MOS transistor having an equal impurity type to the second transistor, and configured to receive a voltage generated by the voltage generator at one end of the fifth transistor, a gate of the fifth transistor connected to the fourth transistor; and a third current source configured to supply a third current to another end of the fifth transistor, wherein a connection node of each gate of the fourth and fifth transistors is connected to a connection node of the third current source and the fifth transistor, wherein the fifth transistor is controlled so that the drain voltage of the first transistor becomes larger than the drain voltage of the second transistor by a predetermined voltage.

20. The light emitting diode drive circuit of claim 14, wherein the voltage adjustor comprises:

a fourth transistor connected between the constant current generation circuit and the first transistor;

a fifth transistor that is a MOS transistor having an equal impurity type to the fourth transistor, a gate of the fifth transistor is connected to the fourth transistor, and one end of the fifth transistor connected to a drain of the second transistor; and a third current source configured to supply a third current to another end of the fifth transistor, wherein a connection node of each gate of the fourth and fifth transistors is connected to a connection node of the third current source and the fifth transistor, wherein the fifth transistor is controlled so that the drain voltage of the first transistor becomes larger than the drain voltage of the second transistor by a predetermined voltage.

* * * * *